United States Patent [19]

Pouliot

[11] 4,280,369
[45] Jul. 28, 1981

[54] BALL/RAMP SYSTEM FOR TORQUE TRANSMISSION

[75] Inventor: Harvey N. Pouliot, Birmingham, Mich.

[73] Assignee: Vadetec Corporation, Troy, Mich.

[21] Appl. No.: 5,605

[22] Filed: Jan. 22, 1979

Related U.S. Application Data

[63] Continuation-in-part of Ser. No. 926,823, Jul. 21, 1978, abandoned.

[51] Int. Cl.³ .................. F16H 15/16; F16H 13/00
[52] U.S. Cl. .................................. 74/191; 74/208
[58] Field of Search .......... 74/198, 191, 208, 190.5, 74/209; 64/29

[56] References Cited

U.S. PATENT DOCUMENTS

| | | | |
|---|---|---|---|
| 1,981,910 | 11/1934 | Ehrlich | 74/200 |
| 2,123,008 | 7/1938 | Hayes | 74/208 |
| 2,559,230 | 7/1951 | Schottler | 74/191 X |
| 2,584,541 | 2/1952 | Brobeck | 74/191 |
| 2,586,725 | 2/1952 | Schottler | 74/796 |
| 2,590,800 | 3/1952 | Stephenson | 74/198 |
| 2,675,713 | 4/1954 | Acker | 74/190.5 |
| 2,730,904 | 1/1956 | Rennerfelt | 74/200 |
| 2,959,063 | 11/1960 | Perry | 74/208 |
| 2,983,121 | 5/1961 | Naas | 64/29 |
| 3,087,348 | 4/1963 | Kraus | 74/200 |
| 3,224,300 | 12/1965 | Chery | 74/190.5 X |
| 3,277,745 | 10/1966 | Harned et al. | 74/200 |
| 3,293,947 | 12/1966 | Chery | 74/198 X |
| 3,397,587 | 8/1968 | Saussele | 74/200 |
| 3,822,610 | 7/1974 | Erban | 74/691 |
| 3,996,807 | 12/1976 | Adams | 74/190.5 |
| 4,075,873 | 2/1978 | Geisthoff | 64/29 |
| 4,112,779 | 9/1978 | Kemper et al. | 74/191 |
| 4,112,780 | 9/1978 | Kemper et al. | 74/191 |
| 4,152,944 | 5/1979 | Kemper | 74/191 |
| 4,152,945 | 5/1979 | Kemper | 74/191 |
| 4,152,946 | 5/1979 | Kemper | 74/196 |

FOREIGN PATENT DOCUMENTS

| | | | |
|---|---|---|---|
| 2634244 | 2/1977 | Fed. Rep. of Germany | 74/191 |
| 1324977 | 3/1963 | France | 64/29 |
| 1354697 | 1/1964 | France | 74/190.5 |
| 376939 | 11/1939 | Italy | 74/208 |
| 870913 | 6/1961 | United Kingdom | 74/208 |

*Primary Examiner*—Leslie Braun
*Attorney, Agent, or Firm*—Robert F. Ziems

[57] ABSTRACT

A ball/ramp force producing system is provided for use in infinitely variable ratio torque transmissions of the type which transmit torque by means of rolling friction contact between pairs of traction surfaces. The ball/ramp system applies a thrust force to a pair of conical traction elements to force the elements into frictional engagement with their respective other traction surfaces. The system includes a collar assembly splined to a support shaft with conical traction elements mounted on the shaft on each side of the collar assembly. Complementary helical ball/ramps are formed on each side of the collar assembly and on the respective cone bases with force transmitting balls located in the ramp sets. Rotation of the collar assembly or the traction elements with respect to one another causes the traction elements to advance in opposite axial directions along the shaft to initiate and maintain engagement between the respective traction surface pairs. The thrust force generated by the ball/ramp system is proportional to the torque transmitted by the transmission.

15 Claims, 18 Drawing Figures

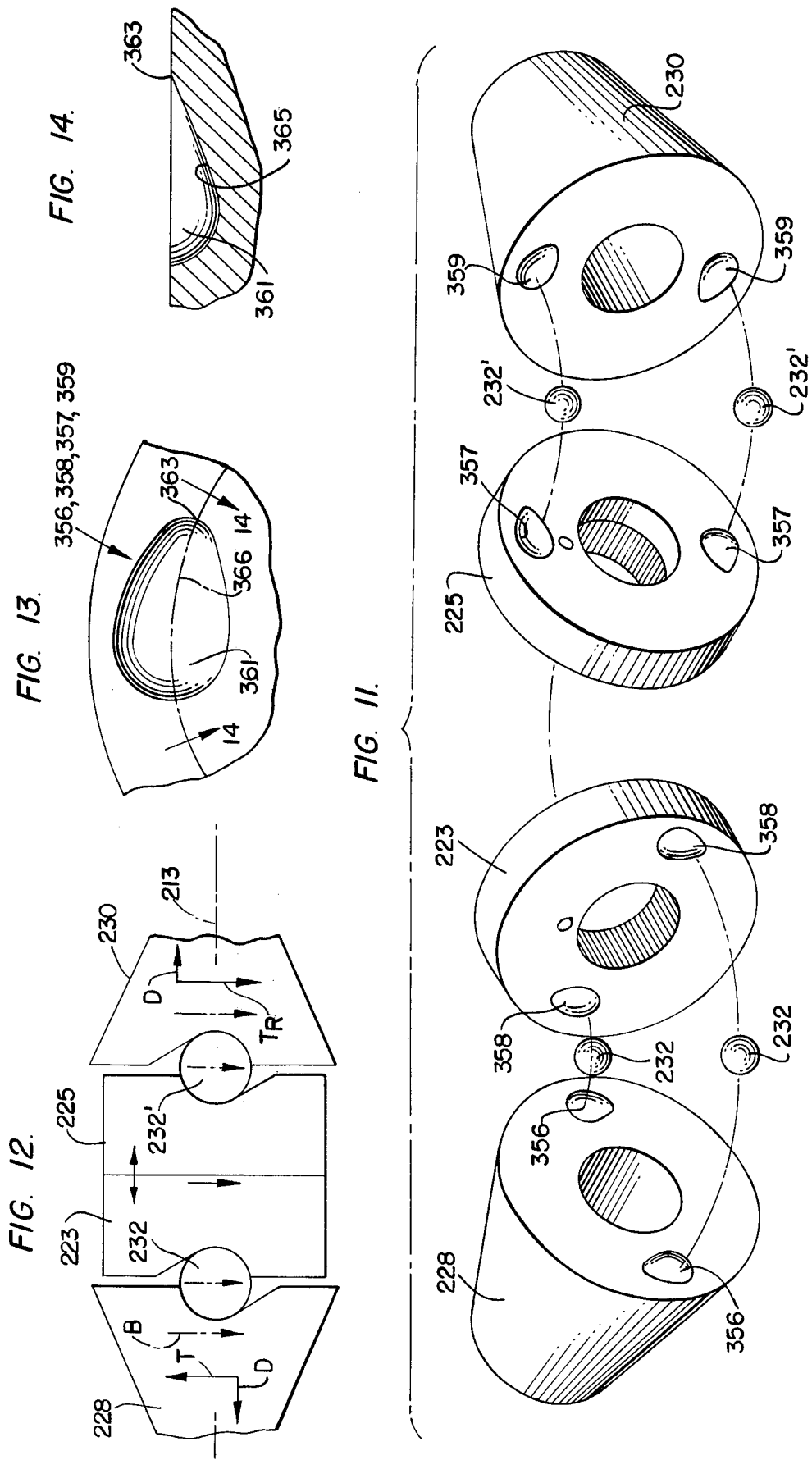

BALL/RAMP SYSTEM FOR TORQUE TRANSMISSION

CROSS-REFERENCE TO RELATED APPLICATION

This is a Continuation-in-Part of now abandonded copending U.S. application Ser. No. 926,823, filed July 21, 1978, by Harvey N. Pouliot, entitled "BALL-/RAMP SYSTEM FOR TORQUE TRANSMISSION" and assigned to the assignee of the present invention.

BACKGROUND OF THE INVENTION

The present invention relates to infinitely variable ratio torque transmissions of the type which transmit torque by means of traction surface pairs in rolling friction contact and, more specifically, to structure for urging the traction surfaces into engagement with one another where the urging force is directly proportional to the torque transmitted.

In a commonly assigned U.S. Pat. No. 4,152,946 issued May 8, 1979 to Yves Jean Kemper and also in U.S. Pat. Nos. 4,112,779 and 4,112,780 both issued Sept. 12, 1978, to the inventors, Yves Jean Kemper and Lucien Bigot, there are disclosed various embodiments of a variable speed torque transmission which generically include a first body having a pair of rolling or traction surfaces of revolution about a first axis, a second body having a pair of rolling or traction surfaces of revolution about a second axis intersecting the first axis at a point of axis intersection and a crank-like body rotatable on the first axis and supporting the second body for movement such that the second axis nutates through a biconical path about the first axis and with the central apex of the biconical path coincident with the point of axes intersection. The traction surfaces on one of the first and second bodies are oppositely convergent or cone-like to provide a variable radial distance from the common axis thereof whereas the traction surfaces on the other of the two bodies may be of a relatively constant radius. Also, the pairs of rolling surfaces on the first and second bodies are respectively interior and exterior so as be frictionally engaged at two points of contact disposed oppositely of the first axis, oppositely of the point of axes intersection and in a plane containing both the first and second axes. The speed ratio of the transmission is varied by shifting the points of traction surface contact relative to the point of axes intersection. In certain embodiments, such as those disclosed in U.S. Pat. No. 4,152,946, such variation in speed ratio is achieved by shifting annular rings constituting one of the first and second bodies axially relative to cone-like surfaces on the other of these two bodies in which the apex half-angle of the cone-like surfaces approximates or is equal to a constant angle of axes intersection. In the embodiments of U.S. Pat. Nos. 4,112,779 and 4,112,780, speed ratio variation and corresponding shifting of the points of traction surface contact occur as a result of changing the angle of the second body which carries internal cylindrical traction surfaces, relative to the first body which carries a pair of axially separable cone-like members or elements defining exterior traction surfaces. In the latter case, the cone-like members are axially shiftable on the first axis through a distance or throw of a magnitude capable of accommodating variation in the angle of axes intersection.

Efficient transfer of torque in all transmission embodiments exemplified by the disclosures of the aforementioned patent documents involves the development of mechanically induced normal forces by which the respective traction surfaces are urged forcibly into engagement with each other at the two points of contact. In most of the disclosed embodiments, the one of the first and second bodies carrying the oppositely converging cone-like surfaces is constituted by a central shaft and a pair of conical members movable axially on the shaft toward and away from the point of axes intersection. The normal friction force is then generated by applying an axially and oppositely directed thrust force to the cone-like traction members to displace them along the axis of the shaft into engagement with the traction surfaces on the other of the two bodies. Examples of structures previously used to accomplish the axial thrusting include expansible fluid chambers, helicoidal ramp arrangements, fluid chambers in combination with inclined ramps and helically grooved control collars.

In those transmission embodiments in which speed ratio variation is achieved by changing the angle of axes intersection, the structure used to thrust the oppositely converging cone-like members axially of the shaft on which they are mounted must be capable not only of providing a normal force commensurate with or proportional to torque transmitted, but also must have sufficient extensibility or throw along the axis of the shaft to accommodate changes in the axial position of the cone-like members when the speed ratio of the transmission is varied. In addition, and because of the overall transmission geometry in all embodiments, machining tolerances and component material distortion under the force loading imposed must be accounted for. In this latter respect, the shaft on which the cone-like members are supported is supported at opposite ends by the crank-like body and is loaded from diametrically opposite directions intermediate the bearing supported ends by reaction to the normal force loading at the two points of traction surface engagement.

SUMMARY OF THE INVENTION

In accordance with the present invention, structure is provided for urging the traction surface pairs of an infinitely variable ratio torque transmission into rolling friction contact with a force which is proportional to the magnitude of the torque transmitted and by which the ratio of thrust to torque varies with axial position of the traction elements in a manner to maintain such ratio optimum throughout the operating range of the transmission. The transmission again includes a first body rotatable about a first axis and a second body mounted on a second axis which intersects the first axis at a point of axes intersection and in which the second body is adapted to be driven in a biconical path about the point of axes intersection. Both the first and second bodies are provided with traction surfaces adapted to contact each other in a torque transmitting rolling friction engagement. The traction surfaces on one of the first and second bodies are on the exterior of cone-like traction members movable along the axis of a torque transmitting shaft toward and away from the traction surfaces of the other of these two bodies, the latter being interior surfaces of revolution.

In all embodiments of the invention, the structure for urging the traction surfaces into engagement includes a ball and roller ramp system effective between one or both of the cone-like members and an axially shiftable, rotatably coupled collar assembly supported on a shaft which carries the cone-like members for relative rotatable and axial movement relative to the shaft. The collar assembly further includes a resilient preload bias as well as a provision for assuring effective operation of the system and the transmission irrespective of machining tolerances and component material distortion under load. Further, the roller ramps in all embodiments are of a configuration in terms of ramp inclination, whether constant or variable, which is correlated with rolling or traction surface configuration in order to optimize the normal force of traction surface engagement for varying torque loads on the transmission.

In one embodiment particularly adapted for use with transmissions in which speed ratios are adjustable by variation in the angle of axes intersection, the roller ramps are bi-directional and effective on both cone-like members to achieve the throw or axial extent of cone member movement required in such transmissions. In another embodiment intended for use where transmission speed ratio is achieved at a constant angle of intersection, the roller ramps are unidirectional and of an opposite pitch on opposite sides of the collar assembly so that the system will be operative irrespective of the direction of torque transfer between the shaft and the cone-like members. In this latter embodiment, the position of the two points of frictional contact between the traction surfaces of the transmission are spaced at slightly different distances from the point of axes intersection without changing the operating symmetry of the transmission and to provide a lead bias by which the balls bottom positively in the one way roller ramps.

The objects and full scope of applicability of the present invention will become apparent from the detailed description to follow taken in conjunction with the accompanying drawings in which like parts are designated by like reference numerals.

BRIEF DESCRIPTION OF THE DRAWINGS

FIG. 11 is an exploded perspective view illustrating components of the ball ramp system in the embodiment of FIG. 9;

FIG. 12 is a schematic view to illustrate ball ramp operation;

FIG. 13 is a fragmentary elevation illustrating ball ramp configuration;

FIG. 14 is a fragmentary cross-section along line 14—14 of FIG. 13;

DETAILED DESCRIPTION OF THE PREFERRED EMBODIMENTS

Figure 1:
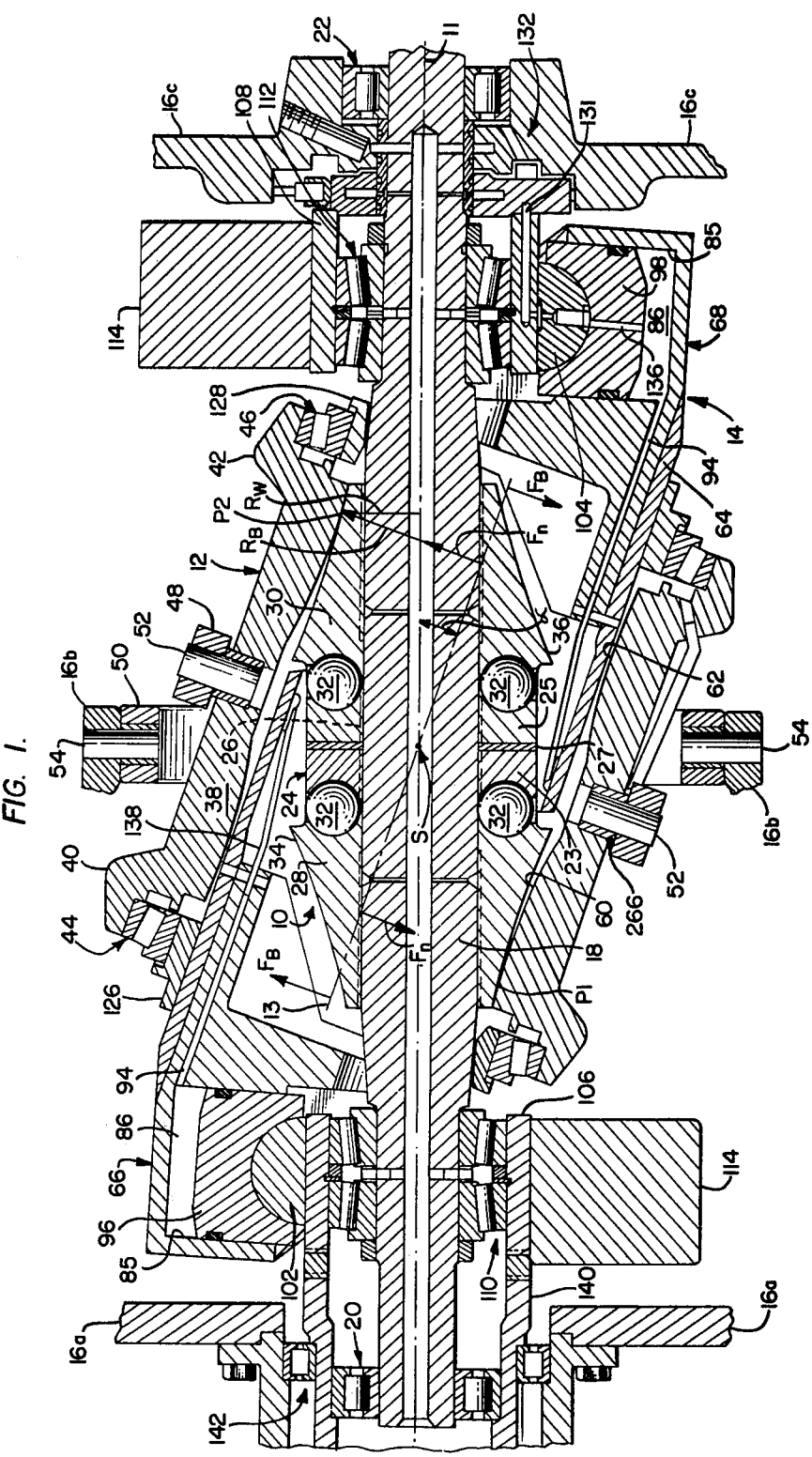
FIG. 1 is a side elevational view, in longitudinal cross-section, of an infinitely variable ratio torque transmission incorporating one embodiment of the present invention.
Figure 2:
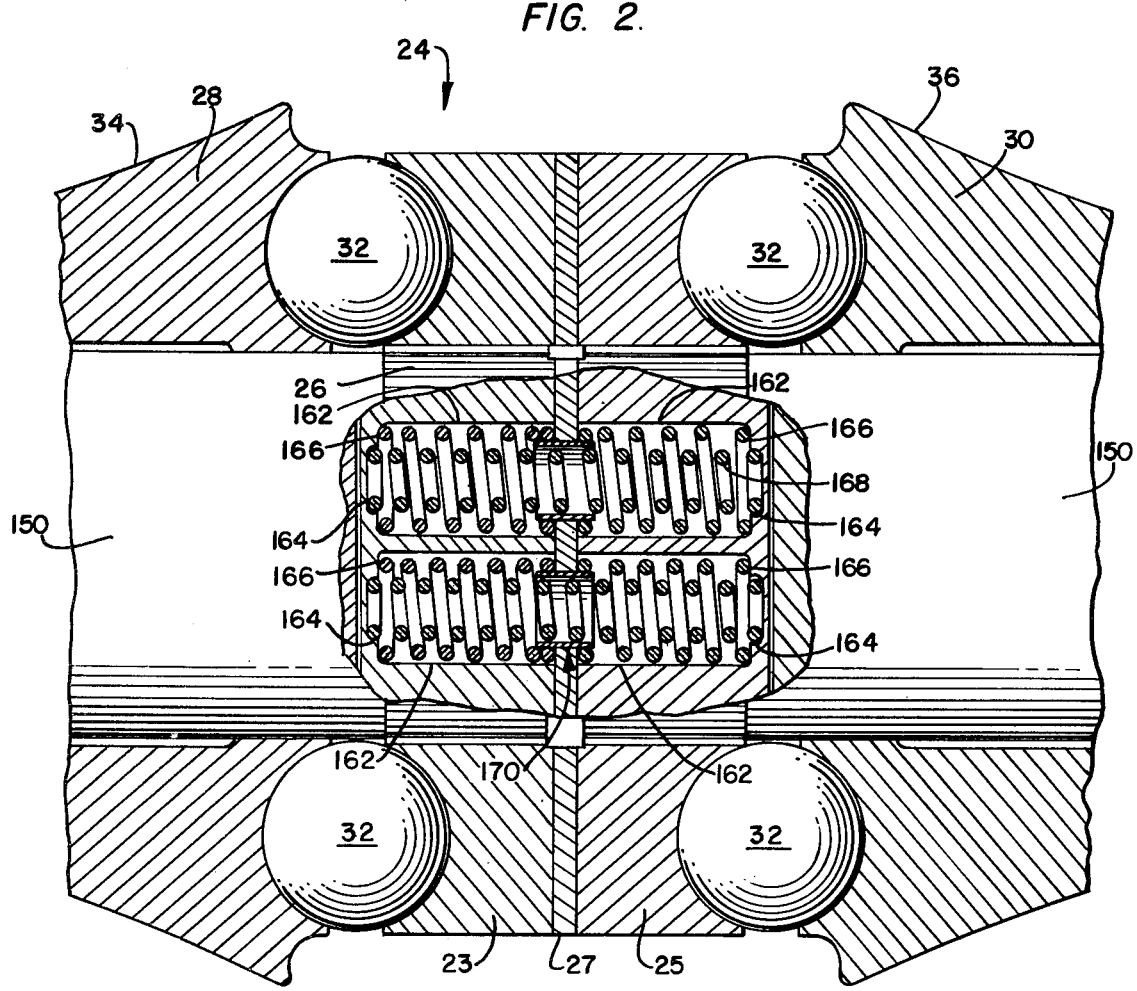
FIG. 2 is an enlarged partial cross-sectional view of a central body shown in FIG. 1.
Figure 3:
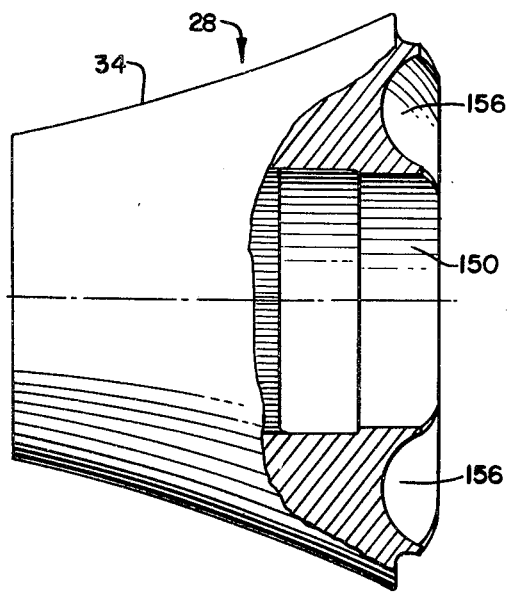
FIG. 3 is a front elevational view, in partial cross-section, of a conical traction element shown in FIG. 2.
Figure 4:
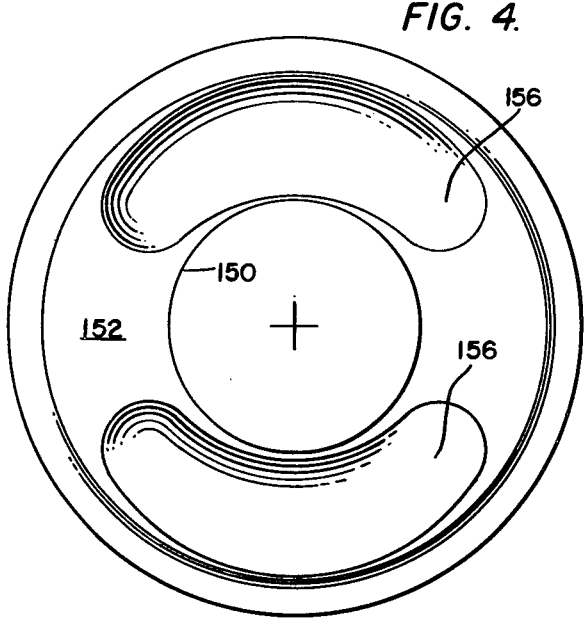
FIG. 4 is a view of the base surface of the conical traction element shown in FIG. 4 showing a ball ramp formed thereon.
Figure 5:
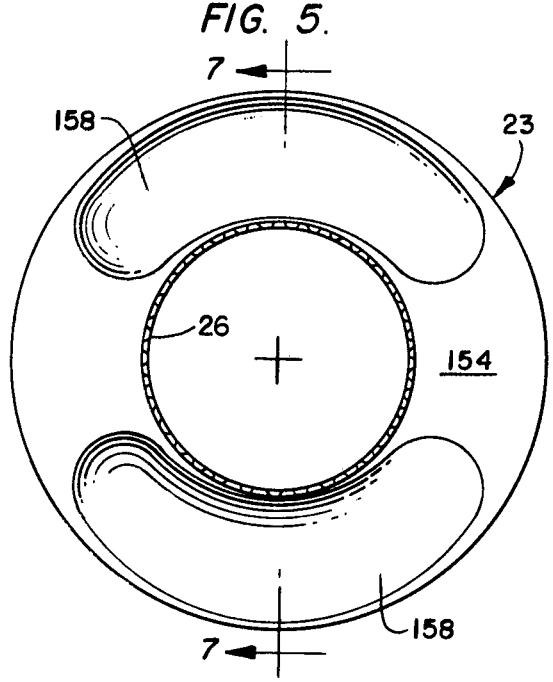
FIG. 5 is a side elevational view of a collar sleeve showing a ball ramp formed thereon and splines formed on the inside diameter thereof.
Figure 6:
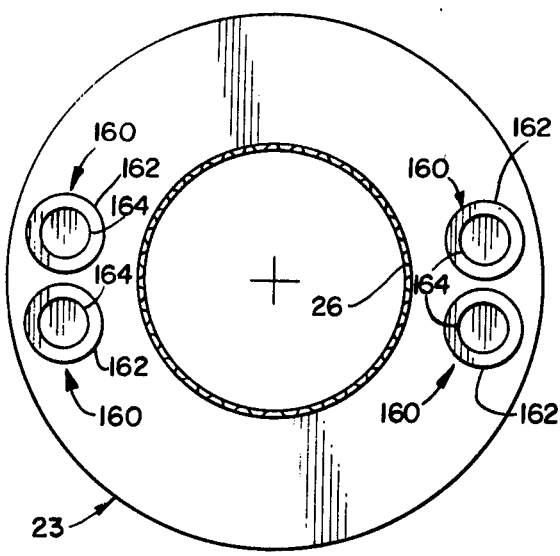
FIG. 6 is a side elevational view of the other side of the collar sleeve shown in FIG. 5.
Figure 7:
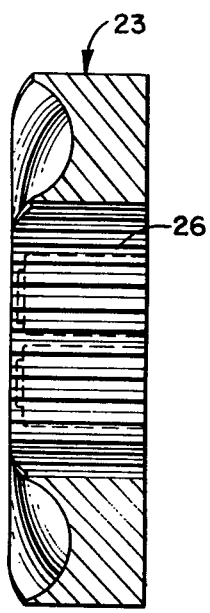
FIG. 7 is a cross-sectional view of the collar sleeve shown in FIG. 5 taken along line 7—7 of FIG. 5.

One embodiment of an infinitely variable ratio torque transmission incorporating the present invention is shown in longitudinal cross-section in FIG. 1. The transmission is mounted in a frame, generally designated by the reference numeral 16 and represented by frame segments 16a, 16b, and 16c. The transmission includes a first or central body 10 rotatable about a first axis 11, a nutatable second body 12 mounted along an inclined second axis 13 which intersects the first axis 11 at a point S of axes intersection and at an angle α of axes intersection, and a cranking body 14 which is mounted for rotation about the first axis 11.

The central body 10 is mounted on a support shaft 18 and includes truncated cone-like traction members or elements 28 and 30, and a collar assembly 24 mounted therebetween. The support shaft 18 is supported for rotation about the first axis 11 on its right side by a roller bearing 22 mounted in the frame segment 16c, and on its left side by another roller bearing 20 mounted in a drive input tube 140.

The traction elements 28 and 30 are mounted on the support shaft 18 on opposite axial sides or ends of the collar assembly 24 with their respective bases facing the collar assembly 24. The traction elements 28 and 30 are mounted on the support shaft 18 such that they may rotate and translate axially relative to the shaft 18. The exterior surface 34 of the traction element 28 and the exterior surface 36 of the traction element 30 are surfaces of revolution about the first axis 11 and are adapted to cooperate with traction surfaces on the nutatable body 12 as described below.

The collar assembly 24 is mounted at the midpoint of the shaft 18 and includes a first collar 23 and a second collar 25 with a cushioning pad 27 located therebetween. Both the collars 23 and 25 are connected to the support shaft 18 by splines 26 (shown in broken line illustration) such that they rotate in a torque transmitting relationship with the shaft 18 but are axially translatable relative to the shaft 18. A plurality of force transmitting balls 32 are located between the traction element 28 and the collar 23, and the traction element 30 and the collar 25. The balls 32 engage complementary roller ramps formed on the respective traction element and collars, and assist in producing axially directed thrust forces to cause the traction surfaces 34 and 36 to engage traction surfaces on the nutatable body 12. The structural details and the functional relationships of the roller ramps, the collar assembly 24, the balls 32, and the traction elements 28 and 30 are described in more detail below.

The nutatable second body 12, which is shown in section in FIG. 1, is in this embodiment generally formed as a cylindrical turning or casting 38 of revolution about the second axis 13. Bearing bosses 40 and 42 are formed at and extend radially outward of each end of the nutatable body 12. The bearing bosses 40 and 42 are counterbored to form an inside diameter surface and a shoulder face which is transverse to the longitudinal axis 13. The counterbored bosses 40 and 42 receive and retain, respectively, the outer race of support bearings 44 and 46 with the inside diameter surface serving as the pilot and mounting surface, and the shoulder face functioning to axially locate the plane of the bearings with respect to the point S of axes intersection. The inner races of the bearings 44 and 46 are mounted respectively, on bearing retainers 126 and 128.

A Cardan or double U-joint is provided to restrain the nutatable body 12 from rotation about the second axis 13. The joint includes an inner ring 48 pivotally connected to the nutatable body 12 by trunnion pins 52 journalled in collar bearings 266 which are, in turn, located in bores formed through the wall of the nutatable body 12. An outer ring 50 pivotally connects the inner ring 48 to the frame segment 16b by trunnion pins 54. This joint is fully disclosed in U.S. Pat. No. 4,112,780, the disclosure of which is incorporated herein by reference to the extent necessary to practice the present invention.

The cranking body 14 is mounted for rotation about the longitudinal first axis 11 and is provided to support the nutatable body 12 and orient the second axis 13. The cranking body 14 is adapted to drive the nutatable body 12, in the manner described below, such that the second axis 13 describes a biconical or diploconical path about the longitudinal axis 11 with the apex of the described cones meeting at the point S of axes intersection. The cranking body 14 includes a torque tube 64 with end fittings 66 and 68 located at each end of the torque tube 64.

The torque tube 64, which has a generally cylindrical form, extends within the nutatable body 12 and has openings or windows at each end. The windows are diametrically opposed to one another and permit the traction surfaces 34 and 36 of the central body 10 to engage, respectively, the traction surfaces 60 and 62 of the nutatable body 12 at two points P1 and P2. The retainers 126 and 128 are located on the outside diameter of the torque tube 14 at opposite ends thereof and support, respectively, the inner races of the bearings 44 and 46.

The end fitting 66 includes a fluid pressure chamber 86 defined between a cylinder 85 and a piston 96 mounted for reciprocation in the cylinder 85. The piston 96 includes a hemispherical recess and is mounted on a hemisphere 102. The diametrically flat portion of the hemisphere 102 is in turn mounted upon a torque block 106 which is rotatably mounted with respect to the shaft 18 by a duplex roller bearing set 110.

The end fitting 68, which is similar in structure to the end fitting 66, also includes a fluid pressure chamber for reciprocation in the cylinder 85. The piston 98 includes a hemispherical recess and is mounted thereat on a hemisphere 104. The diametrically flat portion of the hemisphere 104 is mounted on a torque block 108 which is rotatably mounted with respect to the shaft 18 by duplex roller bearing set 112.

A fluid circuit interconnects the fluid pressure chambers 86 of the end fittings 66 and 68 and a fluid pressure pump 132. The fluid circuit includes a conduit 94 formed in the end fitting 66 which connects a tube 138 with the fluid pressure chamber 86 of the end fitting 66. The tube 138 extends on the inside of the torque tube 64 from the end fitting 66 to a similar fluid conduit 94 formed in the end fitting 68 thereby interconnecting the fluid pressure chambers 86 of the end fittings 66 and 68. A port 136 is formed in the piston 98 and communicates with a similar port formed in the hemisphere 104. These ports in turn communicate with a conduit 131 formed in the torque block 108. The conduit 131 communicates with the fluid pressure pump 132 which is adapted to introduce or remove fluid from the pressure chambers 86. The fluid pressure pump 132, the pressure chambers 86 and their interconnections constitute a fluid control system for varying the angular relationship between the first axis 13 and the second axis 11 as described below.

In the disclosed embodiment, the transmission operates to transmit torque from the torque tube 140, which functions as a drive input, to the support shaft 18, which functions as a drive output. The torque tube 140 is rotatably supported by a roller bearing 142 mounted in the frame segment 16a and has a plurality of axiall extending teeth formed on its end portion. These teeth engage complementary axially extending teeth on the torque block 106. Rotation of the drive tube 140 causes the cranking body 14 to rotate about the longitudinal axis 11. As indicated above, the nutatable body 12 is restrained from rotation about the second axis 13 by the Cardan or double U-joint. As the nutatable body 12 is driven by the cranking body 14, the traction surfaces 34 and 36 of the traction elements 28 and 30 on the central body 10 frictionally engage the traction surfaces 60 and 62 of the nutatable body 12 at the points P1 and P2. The nutation is transmitted through the points P1 and P2 to torque the traction elements 28 and 30 about the shaft 18. The ball and ramp system, described below, responds to the torque transmitted by applying axially directed thrust forces to force the traction elements 28 and 30 in opposite directions towards, respectively, the traction surfaces 60 and 62 of the nutatable body 12, thereby to increase the contact forces between the traction surfaces 34 and 60 at the point P1, and the traction surfaces 36 and 62 at the point P2. The torque applied to the traction elements 28 and 30 by the nutatable body 12 is transmitted through the balls 32 to the collar assembly 24 and then through to the splines 26 to the support shaft 18.

The drive ratio of the transmission is determined in accordance with the general equation:

$$\dot{\omega} - \dot{\alpha} + (\dot{\alpha} - \dot{\beta})\pi = 0$$

In this equation, $\dot{\omega}$ is the angular velocity of the central or first body 10 about the longitudinal first axis 11; $\dot{\alpha}$ is the orbital velocity at which the second axis 13 travels in the bi- or diploconical path about the longitudinal axis 11; $\dot{\beta}$ is the angular velocity of the nutatable body 12 about the second axis 13; and $\rho$ is the ratio of the effective radius $R_b$ of the traction surfaces 60 and 62 on the nutatable second body 12 to the effective radius $R_w$ of the traction surfaces 34 and 36 on the central first body 10 ($\rho = R_b/R_w$). From an examination of the general equation, it will be seen that any one of the transmission components capable of motion at the angular velocities of $\dot{\alpha}$, $\dot{\beta}$ or $\dot{\omega}$ can function as a torque input, a torque output, or a reaction torque. In the disclosed embodiment of the transmission, the nutatable body 12 is restrained from rotation about the second axis 13 by the Cardan or double U-joint such that $\dot{\beta}=0$. In this disclosed mode of operation, the drive ratio of the transmission is determined in accordance with the following simplified version of the general equation:

$$\dot{\omega} = \dot{\alpha} - \dot{\alpha}\rho.$$

As can be seen from the above, the overall torque transmission ratio can be varied by varying $\rho$. This is accomplished, in the embodiment illustrated, by changing the angle $\alpha$ between the longitudinal axes 11 and 13 by means of the fluid control circuit described above.

The angle $\alpha$ may be increased by causing the fluid pressure pump 132 to introduce fluid into the fluid pressure chambers 86. The cranking body 14 is thereby caused to rotate in a clockwise direction about the point S of axes intersection. The angle $\alpha$ is increased and the radius $R_w$ is made smaller relative to $R_b$ thereby increasing $\rho$.

Conversely, the angle $\alpha$ may be decreased by dumping or exhausting fluid from the fluid pressure chambers to cause the cranking body 14 to rotate counterclockwise about the point s of axes intersection. The angle $\alpha$ is decreased and the radius $R_w$ is made larger relative to $R_b$ thereby decreasing $\rho$. Counterbalance weights 114 are provided on each end fitting 66 and 68 and are rotatable with the cranking body 14. When rotated the counter weights 114 provide a counterclockwise torque to assist in rotating the cranking body 14 in a counterclockwise direction about the point S of axes intersection when fluid is exhausted from the fluid pressure chambers 86.

In order for the transmission to transmit torque it is necessary that traction elements 28 and 30 be forced or urged in axially opposite directions along the longitudinal axis 11 to accommodate for positional changes of traction surfaces 60 and 62 of the nutatable body and to develop the normal forces $F_n$ (FIG. 1) at the points of rolling friction contact. This function, in the embodiment under consideration, is accomplished in accordance with the present invention by means of the ball/ramp force producing system shown in FIGS. 2–8.

As shown in FIGS. 2–7, a ball/ramp system in accordance with the present invention is incorporated into the collar assembly 24 and the traction elements 28 and 30. The collar assembly 24, as described above, includes a collar 23 and a collar 25 with a cushioning pad 27 located therebetween. Both the collars 23 and 25 have splines 26 formed on the inside diameters thereof adapted to engage complementary splines (not shown) formed on the support shaft 18 such that the collars 23 and 25 are rotatable with the support shaft 18 and axially translatable relative thereto. The traction elements 28 and 30, as described above, are formed as truncated cone-like elements, the respective outer surfaces of which constitute the traction surfaces 34 and 36. Each of the traction elements 28 and 30 have a centrally formed bore 150 therethrough and are mounted on the support shaft 18 for both rotation and axial translation relative thereto.

The radial base surfaces 152 of each of the traction elements 28 and 30 have two helical ball/ramps 156 formed therein. The ramps 156 are formed at a common radius with respect to the central axis of the traction elements and extend along identical circumferential segments. When viewed in transverse cross-section, as in FIG. 3, the ramps 156 have a concave profile. Also, each of the ramps 156 is bi-directional in that each includes a pair of inclined ramp surfaces extending in opposite directions from a central depression.

The radial faces 154 of the collars 23 and 25 opposite the surfaces 152 of the traction elements 28 and 30 also have two helical ball/ramps 158 formed therein. The ramps 158 are formed at the same radius as the ball/ramps 156 and have the same overall configuration. The ball/ramps 156 of the traction elements 28 and 30 and the ball/ramps 158 of the collars 23 and 25 from complementary ball/ramp sets therebetween, each of which has a ball 32 located therein. The angle of inclination of the respective complementary ball/ramps 156 and 158 are such that the axial position of the traction elements 28 and 30 will change when the elements are rotated relative to the support shaft 18.

Each one of the collars 23 and 25 is provided with four double-counterbored holes 160, each of which includes an outer counterbore 162 and a coaxial inner counterbore 164 with a shoulder surface 166 between the inner and outer counterbores 162 and 164. The collars 23 and 25 are mounted on the support shaft 18 such that the holes 160 are in facing registration with one another.

The collars 23 and 25 are resiliently urged away from one another in opposite axial directions under a preload bias by a helical inner spring 168, in compression, located within each pair of holes 160. Each spring 168 has one end bearing against the bottom of the inner counterbore 164 of the collar 23 and the other end bearing against the bottom of the inner counterbore 164 of the other collar 25. The inner spring 168 extends through a guide tube 170 mounted in a throughbore formed in the cushioning pad 27. The tube 170 functions to prevent the inner spring 168 from binding on the edge of the throughbore in the cushioning pad 27.

The cushioning pad 27 is resiliently urged to a position intermediate the collars 23 and 25 by a helical outer spring 172, in compression, mounted in each outer counterbore 162. Each spring 172 has one end bearing against the shoulder surface 166 and the other end bearing against the cushioning pad 27.

The inner springs 168 resiliently urge the collars 23 and 25 in opposite axial directions to initiate contact between the traction surfaces 34 and 36 of the traction elements 28 and 30 and the traction surfaces 60 and 62 of the nutatable body 12 at the aforementioned contact points P1 and P2. As the nutatable body 12 is driven by the cranking body 14, the traction surfaces 60 and 62 torque the traction elements 28 and 30 about the support shaft 18. This torque causes a small amount of rotation of the traction elements 28 and 30 relative to the support shaft 18. The ball/ramp system in response to this relative rotation, advances the traction elements 28 and 30 in opposite axial directions toward the traction surfaces 60 and 62 to develop the normal forces $F_n$ necessary to maintain effective rolling frictional engagement between the traction surface pairs at the points P1 and P2. If the magnitude of the torque transmitted is increased, the torque applied to the traction elements 28 and 30 is increased to cause a further rotation of the traction elements 28 and 30 relative to the support shaft 18. The ball/ramp system responds by increasing the thrust force applied to the traction elements 28 and 30 to increase the normal force $F_n$ at the aforementioned points P1 and P2. As can be appreciated, the thrust forces applied to the traction elements 28 and 30 are proportional to the torque transmitted.

As a consequence of the transmission of torque, the entire central body 10 is subject to a compressive load which is directly opposite and equal to the thrust forces. The cushioning pad 27, which may be fabricated from an elastic material such as nylon, serves to distribute the compressive forces between the collars 23 and 25 and to equalize the load on each of the roller elements 32. For example, it is possible that clearances and tolerances may accumulate such that the longitudinal axis of one or both of the collars 23 and 25 may be skewed with respect to the longitudinal axis 11 of the support shaft 18 and result in an unequal distribution of the compressive forces on the roller elements. In addition, the cushioning pad 27 will accommodate any misalignment of the components carried by the shaft 18 as a result of the shaft 18 deflecting under the normal force loading of the traction surfaces.

As a consequence of the compressive loading system thus provided, all components of the central body 10, are retained under a compressive load at all times. This feature is important not only to maintain traction surface contact at all times but also to assure contact at all times between the balls 32 and the ramps 156 and 158. This latter contact is important during removal of output torque loads particularly during reversals in the direction of torque transmission. Because of the compressive loading of ramps against the balls, retention of the balls in the ramps is assured.

Figure 8A:
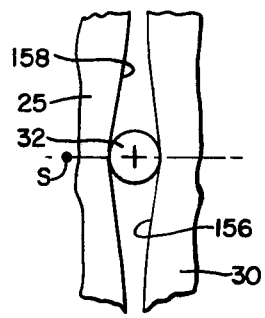
FIG. 8a is a schematic representation of a complementary ball ramp set showing the traction element in its retracted position.
Figure 8B:
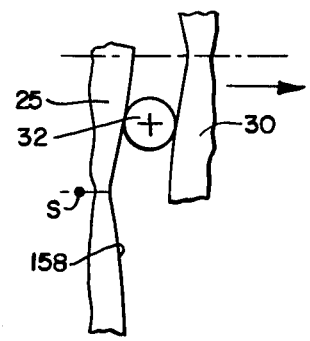
FIG. 8b is a schematic representation of a complementary ball ramp set shown in FIG. 8a with the traction element shown advancing in an axial direction for relative rotation in a first direction.
Figure 8C:
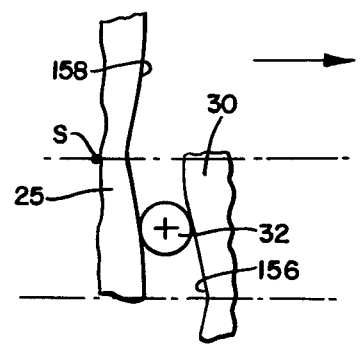
FIG. 8c is a schematic representation of a complementary ball and roller ramp set shown in FIGS. 8a and 8b with the traction element shown advancing in an axial direction for relative rotation in a second direction.

The traction elements relative to their respective collars as well as the effective geometric configuration of the ball/ramps is represented schematically in FIGS. 8a, 8b and 8c. In these figures, a portion of a collar 25 and a traction element 30 are shown in schematic form, such portion including the respective ball/ramps 156 and 158 between which the ball 32 is shown. Also, it will be noted in these figures that the effective ramp surface of the ball/ramps 156 and 158 are variably inclined as a result of a curved configuration rather than linearly inclined.

In FIG. 8a the collar 25 and cone element 30 are shown in their relative positions when the traction elements are retracted fully towards the point S of axes intersection, a condition which will exist when the axis 13 of the nutatable body 12 is at its maximum inclination with respect to the first axis 11. In this condition, the function $\rho$ will be maximum and correspondingly the rotational velocity $\dot{\omega}$ will be maximum for a given rotational velocity $\dot{\alpha}$ of the cranking body 66. It will be appreciated further that in this condition, for a given power input, torque transmitted by the traction surfaces will be reduced.

As the speed ratio of the transmission is reduced by reducing the angle between the axes 11 and 13, the condition depicted in FIG. 8b will be obtained. The reduction in the nutational angle of the body 12 coupled with the continued transmission of torque between the traction surfaces will result in relative rotation between the traction element 30 and the sleeve 25 causing the element 30 to be moved axially to the right as depicted in FIG. 8b or away from the point S of axes intersection. Because the function $\rho$ is decreasing during this time, the speed ratio is reducing and also the magnitude of torque (for constant power) transmitted between the traction surfaces is increasing. Because of the curved configuration of the ramps 156 and 158 and also because of the geometric configuration of the traction surfaces 36 and 60, the normal force between the traction surface will increase with increasing torque transmission at the traction surfaces.

In FIG. 8c, the components 25, 30, and 32 are depicted in relative positions which result from a reversal of torque in the transmission. Such a reversal of torque might occur, for example, when the transmission is used to drive a vehicle which is decelerating and thus, where torque is transmitted in a direction from the transmission output back to its input.

The use of helically inclined ball/ramps on the collar and oppositely inclined helical ramps on traction elements effectively doubles the range of axial displacement of traction elements over that which would be available with single ramp arrangements. In addition, the axial thrust provided by the present invention and the consequently developed normal forces $F_n$ are automatically adjusted in response to the torque transmitted. Moreover, the ratio of the thrust to torque will vary and as a result of the curved ball/ramps in a manner optimizing torque transfer between the traction surfaces throughout the operating speed ratio of the transmission.

As pointed out above, the curved configuration of the ramps 156 and 158 is related to the geometric configuration of the traction surfaces 36 and 60 to optimize the normal force between the traction surfaces for the torque transmitted at such surfaces. Also in this respect, it will be noted that the traction surfaces 36 on the elements 28 and 30 are axially concave so that as the points of traction contact move from the small end to the large end of these cone-like elements, the direction of normal force shifts from primarily radial to a direction having a substantial axial component. As will be appreciated by a review of the several embodiments of transmissions disclosed in patent documents cited previously herein, the particular configuration of the cone-like elements may vary from the axially concave configuration of the illustrated embodiment to a true conical configuration or to a configuration in which the surfaces are axially convex. The particular shape of the ball/ramp 156 and 158 as illustrated in FIGS. 8a, 8b, and 8c, therefore, may be varied to achieve normal force loading of the traction surfaces correlated with transmitted torque and with the particular shape of the torque transmitting traction surfaces.

Figure 9:
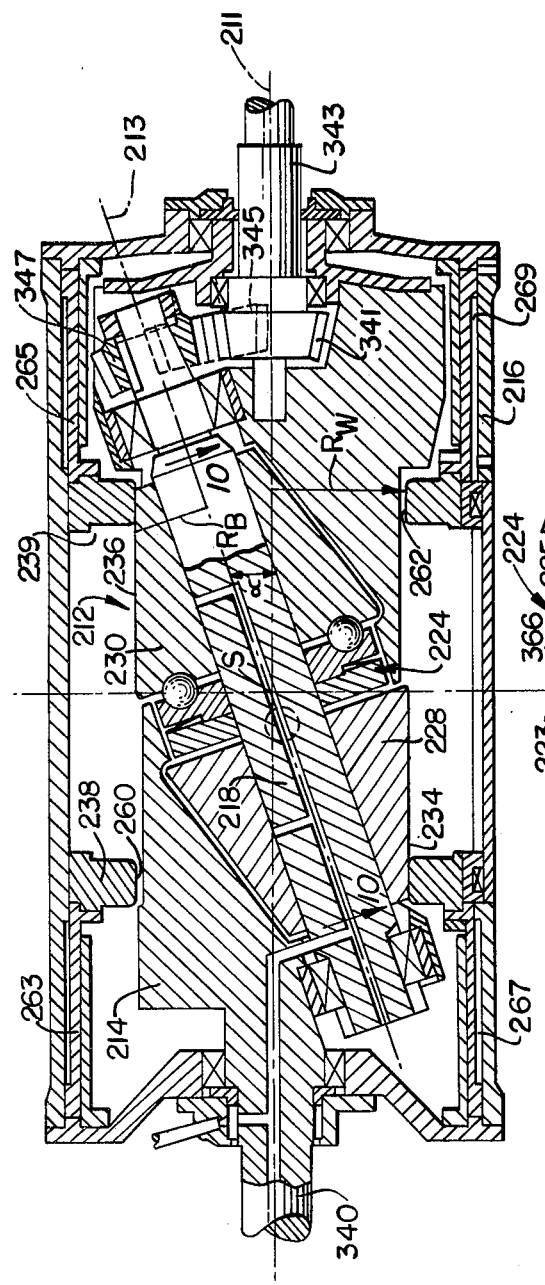
FIG. 9 is a longitudinal cross-sectional view illustrating an alternative embodiment of the present invention.

In FIGS. 9-14 of the drawings, an alternative embodiment of the invention is illustrated. This embodiment has particular, though not exclusive, utility in infinitely variable torque transmissions of a class represented by the several embodiments disclosed in U.S. patent application Ser. No. 706,291, or in which variation in speed ratio is achieved with a constant angle $\alpha$ of axes intersection. An embodiment of this type of transmission is shown in FIG. 9 to include a frame 216, a cranking body 214 journalled in the frame for rotation about a first axis 211 and carrying a second or nutatable body 212 on a second axis 213 inclined at the angle $\alpha$ with respect to the first axis and again intersecting the first axis at the point S of axes intersection. The first body, in this instance, is constituted by a pair of annular rings 238 and 239 defining, respectively, interior traction surfaces 260 and 262 of revolution about the first axis 211 at a constant $R_w$. The rings are carried at the inner ends of annular pistons 263 and 265 operable in annular chambers 267 and 269 provided in the frame 216. The rings 238 and 239 are held against rotation with respect to the frame ($\dot{\omega}=0$) and are movable simultaneously toward and away the point S along the first axis 211 by hydraulic fluid passed to and from the chambers 267 and 269 by a control system (not shown).

The second body 212 of the transmission embodiment illustrated in FIG. 9 is constituted by the shaft 218, conelike elements 228 and 230 and an alternative embodiment of a ball/ramp system 224. It will be noted, therefore, that although the organization of first and second bodies in relation to first and second axes in both transmission embodiments of FIGS. 1 and 9 is the same, the second body 212 in FIG. 9 includes the assembly of cones 228, 230, shaft 218 and ball/ramp assembly 224 whereas in FIG. 1, the cones 28, 30, shaft 18 and ball-/ramp assembly 24 are parts of the first body 10. The cone elements 228 and 229, moreover, establish truly conical or frustoconical traction surfaces 234 and 236 and as such, are generated by a straight line displaced from the second axis by a variable radius $R_b$.

Power supplied to an input shaft 340 in FIG. 9 at the speed $\dot{\alpha}$ is transmitted to a sun gear 341 keyed to an output shaft 343, rotatable at a speed $\dot{\theta}$, from an idler gear 345 journalled on the cranking body 214 and in mesh with a planet gear 347 keyed to one end of the shaft 218. Speed ratio of the transmission embodiment in FIG. 9 varies in accordance with the equation:

$$\dot{\theta}=\dot{\alpha}(1-k/\rho).$$

In this equation, k is the gear ratio function (the diameter of the planet pinion 345 divided by the diameter of the sun gear 341) and $\rho$ is again the ratio, $R_b/R_w$. The magnitude of torque transmission through the cone elements 228, 230 to the shaft 218 is again determined by the torque load on the output shaft 343.

Figure 10:
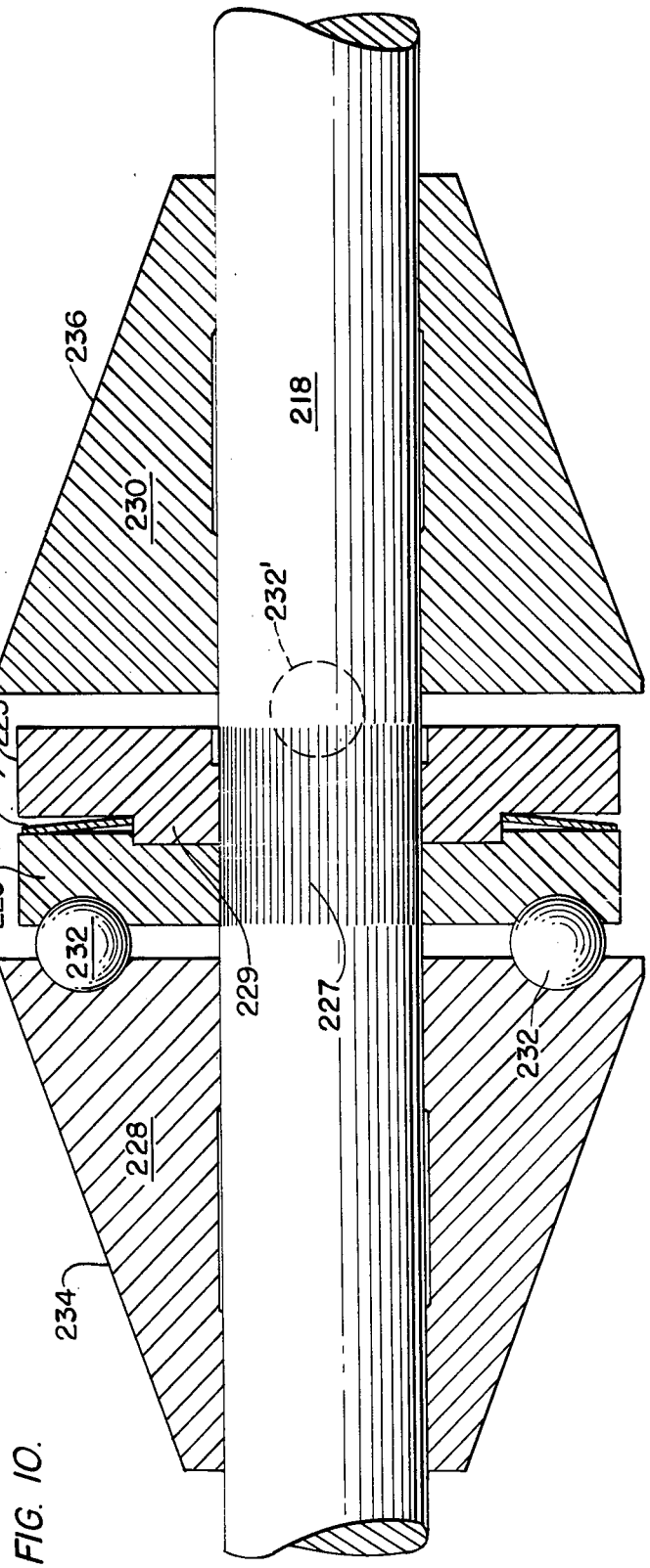
FIG. 10 is an enlarged fragmentary cross-section on line 10—10 of FIG. 9.

The construction of the ball/ramp assembly 224 is illustrated most clearly in FIGS. 10 and 11 of the drawings. As shown, the assembly 224 again includes a pair of axially separable collars 223 and 225 slidable on but nonrotatably coupled to the shaft 218 as a result of axial splines 227. The collars 223 and 225 are again provided with an axial preload separating bias effected by a Belleville spring washer 366 engaging between the collars 223 and 225 and retained concentric with the shaft 218 such as by a hub 229 on one of the collars, in this instance, the collar 225.

The mutually facing radial end surfaces of the collar 223 and the cone element 228, on the one hand, and of the collar 225 and the cone element 230, on the other hand, are again spaced by balls 232 and 232' positioned in ramp formations. In particular, the radial end face at the base of the cone element 228 is provided with a pair of ramp formations 356 and the end face on the collar 223 provided with ramp formations 358. The ramp formations 356 and 358 engage opposite sides of the balls 232. Similarly, the outwardly facing radial end surface of the collar 225 is provided with ramp formations 357 to engage one side of the balls 232' which are engaged on the diametrically opposite side by ramp formations 359 in the base end face of the conical element 230.

Although the precise angular relationship of the ball pairs 232 and 232' as determined by the angular relationship of the ramp formations in which they are situated will be described in more detail below, it will be noted from FIGS. 10 and 11 that the balls 232 lie in a longitudinally radial or meridional plane approximately perpendicular to the meridional plane of the balls 232'. This disposition of the balls in the embodiment of FIGS. 9–14 is a substitute for the resilient pad 27 in the embodiment of FIGS. 1–7. In other words, any misalignment of the cone elements 228 and 230 with the collars 223 and 225 as a result of machining tolerances or deflection in the shaft 218 will be fully accommodated by the approximate 90° angular displacement of the ball pairs 232 and 232'.

It will be noted also that each of the ramp formations 356, 358, 357 and 359 are of a physical configuration illustrated most clearly in FIGS. 13 and 14 of the drawings. As shown, each ramp extends from a ball seating pocket 361 of concave hemispherical shape at one end to another end 363 intersecting the end face in which they are formed, through an inclined linear ramp surface 365. The ramp surface lies on an arc 366 which is concentric with the axis of rotation, in this instance the axis 213, and tangential with the ball seating pocket. The linear helicoidal configuration of the ramp surface 365 is selected in this embodiment because of the linear configuration of the generatrix of the 234 and 236 on the conical elements 228 and 230. While the ramp surfaces 365 in the illustrated embodiment are of constant pitch or linear, it will be appreciated from the preceeding description with respect to FIGS. 8a–8c that the slope of the ramp surfaces 365 may be variable depending on the configuration of the frictionally engaged traction surfaces of the transmission.

Each of the ramp formations 356, 358, 357 and 359 is of the same physical conformation as presented from the end face in which they are formed and in fact, each is machined using the same tooling. When assembled, however, the collars 223 and 225 as well as the cone members 228 and 230 are rotated end-for-end so that the ramp formations 357 and 359 which coact with the ball pair 232' are pitched oppositely from the ramp formations 356 and 358 which cooperate with the ball pair 232. The effect of this orientation of the ball ramps may be appreciated from the schematic illustration of FIG. 12. In referring to FIG. 12 it should be kept in mind that the conical elements 228 and 230 are both rotatable and axially movable on the shaft 218 about and along the axis 213 whereas the collars 223, 225 rotate as a unit with the shaft 218 and are axially slidable thereon. Thus, in FIG. 12, a torque load resulting in rotation of the cone element 228 relative to the shaft 218 and collars 223, 225 in a direction represented by the arrow T will result in axial separation of the cone 228 from the collar 223 by a distance D.

No relative rotation or axial displacement will occur between the conical element 230 and the collar 225. Because both cone members and collars are slidable on the shaft 218, however, the displacement of the cone 228 and collar 223 will elongate the assembly of the cones 228, 230 and collars 223 and 225 causing the traction surfaces 234 and 236 on the elements 228 and 230 to be driven against the internal traction surfaces 260 and 262 of the rings 238 and 239. If, on the other hand, and as a result of a torque reversal, the cones are driven in the opposite direction relative to the shaft 218, specifically in the direction of the arrow $T_r$, then the cone 230 will be displaced from the collar 225 with the thrust force being applied equally to the traction surfaces on both cones.

The one way operation of each of the ramp formations coupled with the provision of a ball seating pocket in each formation is important for still another reason. With reference again to FIG. 12, it will be noted that rotation of the cone 228 in a direction corresponding to the dashed arrow B will be transmitted through the ball 232 to rotation of the collars 223 and 225 as well as through the ball 232′ to rotation of the cone 230. As a result of this, the embodiment of the ball/ramp system 224 can be positively prevented from actuation by imposing a rotational lead bias on one of the cone elements 228 and 230 tending to seat the balls 232 in the bottom or ball seating pocket 361 of the ramp formations.

In this last respect, it is noted that the preload bias provided, for example, by the Belleville spring 366 causes the traction surfaces 234 and 236 to engage at all times with the internal traction surfaces 260 and 262 on the rings 238 and 239. Under conditions where no torque load is imposed on the output shaft 343, it is possible for a recirculating torque path to exist between the cones 228 and 230 and which may result in an unwanted or accidental actuation of the ball ramp system. The recirculating torque path, under such conditions of operation, is self building as a result of the ramp system and may end in a jamming of the transmission. This condition is prevented from occurring by providing, in combination with the arrangement of ramp formations in the embodiment of FIGS. 9–14, a rotational lead bias on one of the cone members, specifically the cone element 228 in the disclosed embodiment, so that the balls 232 and 232′ will be forceably seated in the ball seating pockets 361 of the respective ramp formations.

Figure 16:
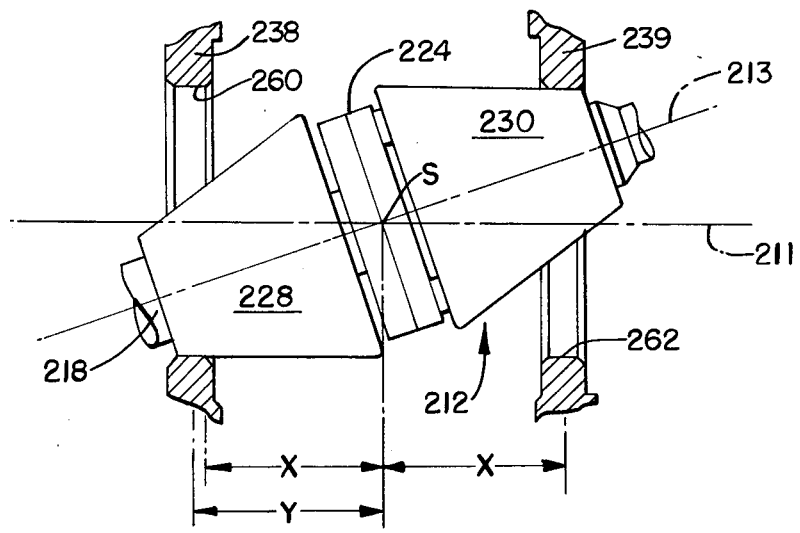
FIG. 16 is a schematic diagram depicting dimensional parameters for providing a lead bias in the transmission embodiment of FIG. 9.

The manner in which the rotational lead bias is imposed on the cone 228 may be understood by reference to FIG. 16 of the drawings. In infinitely variable transmissions of the general type under consideration, maximum operating efficiency is obtained where the two points of traction surface contact are truly symmetrical with respect to the point S of axes intersection. It has been found, however, that a slight tolerance departure from true symmetry will not adversely affect efficient operation of the transmission. Thus, in FIG. 16, true symmetry of the rings 238 and 239 with respect to the nutatable body 212 would be represented where the rings are centered at equal distances X from along the first axis 211 from the point S of axes intersection. By displacing the ring 238 slightly further from the point S than the ring 239, as represented by the dimension Y in FIG. 16, a rotatable lead bias may be imposed on the cone element 228 without sacrifice of overall transmission efficiency. The effect of increased displacement of the ring 238 by the dimension Y over the dimension X, when representing the distance through which the ring 239 is displaced from the point S, results in a slightly smaller effective radius $R_b$ on the cone 228 than the effective radius $R_b$ on the cone 230 with the result that the cone 228 will tend to rotate slightly faster than the cone 230. By appropriate selection of the direction of ramp formation pitch, increased rotation of the cone element 228 in the direction of the dashed arrow B of FIG. 12 will bias the ball/ramp assembly to a positively seated condition.

As mentioned previously, the ball pairs 232 and 232′ lie in approximately perpendicular meridional planes to accommodate component misalignment as a result of deflection in the shaft 218, for example. Also, it will be recalled that only one set of the balls 232 and 232′ is operative for a given direction of torque transmission. In most practical applications of power transmissions, the direction of torque transmission is primarily in one direction and only secondarily in the reverse direction. In a vehicular application, for example, the direction of torque transmission is primarily from the engine or prime mover through the transmission to the vehicular load or drive wheels. A torque reversal will occur only when the prime mover or engine absorbs the kinetic energy of vehicular momentum where torque developed by the load is transmitted in a reverse direction back to the engine or prime mover.

Figure 15:
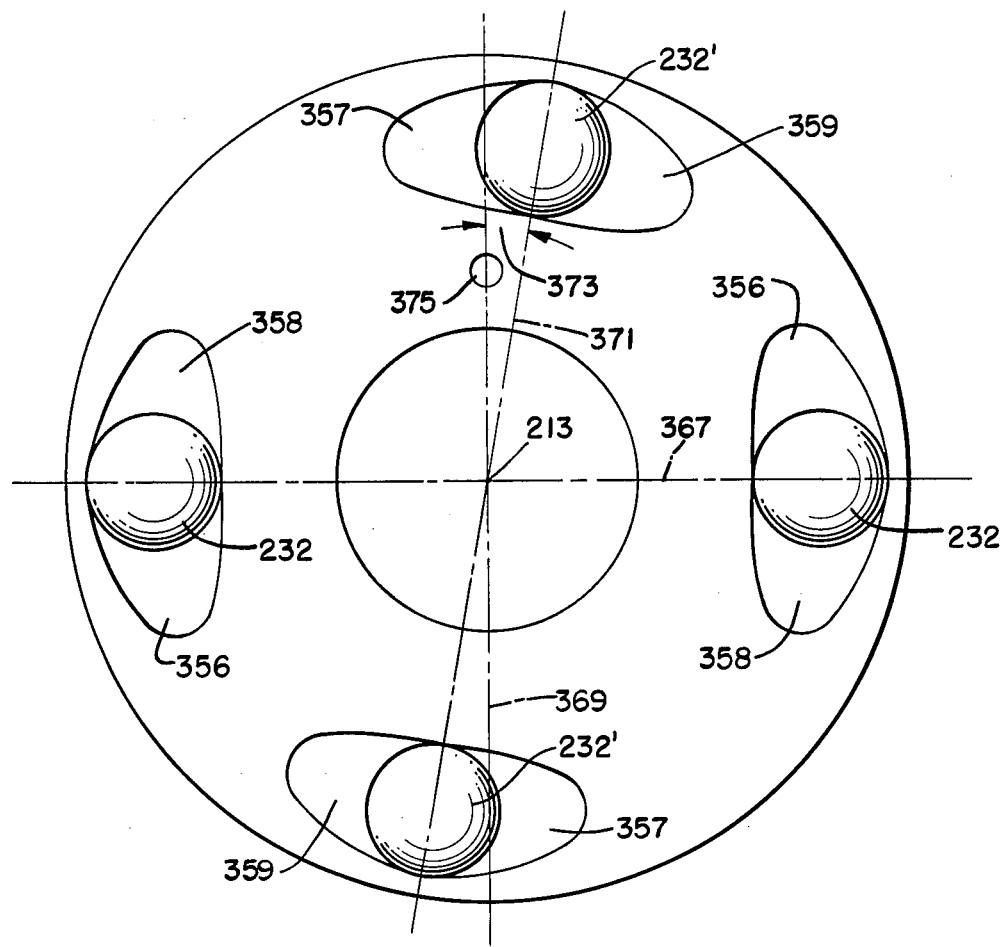
FIG. 15 is a schematic view representing a plurality of superimposed radial sections.

In FIG. 15, the ramps 356 and 358 or the seated position of the balls 232 lie on a meridional plane 367 including the axis 213 and perpendicular to a meridional plane 369. The ramps 357 and 359 and correspondingly, the seated position of the balls 232′, lie on a meridional plane 371 offset from the plane 369 by an angle 373. A pin locating hole 375 facilitates mounting the collars 223 and 225 on the shaft 318 in this angular relationship. If it is assumed that the balls 232′ are primarily operative to develop the normal force between the traction surfaces of the transmission during torque transmission in a direction from a prime mover to a load, for example, then the position of the balls 232′ during operation of the ramps 357 and 359 will advance into the plane 369 and be approximately perpendicular to the balls 232 during such primary operation of the transmission. In this way, a universal joint type flexibility is maintained between the cone members 228 and 230 for the accommodation of deflection in the shaft 218. In applications where the transmission is used for transmission of torque equally in both directions the angular offsetting of the perpendicular radial planes in which the respective pairs of ball/ramps operate would be eliminated.

Thus it will be appreciated that as a result of the present invention, an unique system is provided for traction drive torque transmissions of the type referred to. It will also be appreciated that modifications and/or changes in the disclosed embodiments will be apparent to those skilled in the art from the present description. It is expressly intended, therefore, that the foregoing is illustrative of preferred embodiments only, not limiting, and that the true spirit and scope of the present invention is to be determined by reference to the appended claims.

I claim:

1. In an infinitely variable torque transmission having a body supported by axially spaced bearings and including a shaft concentric with the axis defined by said bearings, a pair of axially spaced traction elements concentric with said shaft and positioned between said bearings, both of said traction elements being independently rotatable and axially translatable relative to said shaft and having traction surfaces of revolution concentric with said axis, said traction surfaces being in rolling frictional engagement at two points of contact with another pair of traction surfaces under normal force loading developed by axial and radial force components on said traction elements and said shaft, the relative magnitude of said axial and radial force components being dependent on the geometrical configuration of said traction surfaces at the points of rolling friction contact, torque transmitting means between said traction elements and said shaft comprising:

axially shiftable collar means on said shaft between said traction elements, said collar means being rotatably coupled with said shaft and having oppositely facing ends;